United States Patent
Nguyen et al.

(10) Patent No.: US 11,236,599 B2
(45) Date of Patent: Feb. 1, 2022

(54) METHODS OF LOW-RATE HYDRAULIC FRACTURING TREATMENTS

(71) Applicant: Halliburton Energy Services, Inc., Houston, TX (US)

(72) Inventors: Philip D. Nguyen, Houston, TX (US); Ronald Glen Dusterhoft, Katy, TX (US); Stanley V. Stephenson, Duncan, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 74 days.

(21) Appl. No.: 16/737,138

(22) Filed: Jan. 8, 2020

(65) Prior Publication Data
US 2021/0207467 A1 Jul. 8, 2021

(51) Int. Cl.
| | | |
|---|---|---|
| *E21B 43/267* | (2006.01) | |
| *C09K 8/80* | (2006.01) | |
| *E21B 47/10* | (2012.01) | |
| *E21B 49/00* | (2006.01) | |
| *C09K 8/74* | (2006.01) | |

(52) U.S. Cl.
CPC ............ *E21B 43/267* (2013.01); *C09K 8/74* (2013.01); *C09K 8/80* (2013.01); *E21B 47/10* (2013.01); *E21B 49/00* (2013.01)

(58) Field of Classification Search
None
See application file for complete search history.

(56) References Cited

U.S. PATENT DOCUMENTS

| | | |
|---|---|---|
| 7,461,696 B2 | 12/2008 | Nguyen et al. |
| 8,448,706 B2 | 5/2013 | Hughes et al. |
| 8,464,971 B1 | 6/2013 | Munisteri |
| 9,512,350 B2 | 12/2016 | Vo |
| 9,562,425 B2 | 2/2017 | Nguyen et al. |
| 9,670,762 B2 | 6/2017 | Nguyen et al. |
| 9,850,748 B2 | 12/2017 | Nguyen et al. |
| 9,909,057 B2 | 3/2018 | Nguyen et al. |

(Continued)

OTHER PUBLICATIONS

International Search Report and Written Opinion issued in related PCT Application No. PCT/US2020/012832 dated Sep. 28, 2020, 12 pages.

(Continued)

*Primary Examiner* — Andrew Sue-Ako
(74) *Attorney, Agent, or Firm* — Thomas Rooney; Baker Botts L.L.P.

(57) ABSTRACT

The disclosure provides a method comprising of determining an injection flow rate for each one of a plurality of wells, determining a total injection flow rate for the plurality of wells, introducing sequentially a series of treatment fluids into a well bore of each one of the plurality of wells, wherein each of the well bores penetrates at least a portion of a subterranean formation, the series of treatment fluids comprising: a first treatment fluid that comprises a base fluid and a reactive agent; and a second treatment fluid that comprises a microproppant slurry, allowing the first treatment fluid to form one or more fractures in the subterranean formation, and depositing at least a portion of a microproppant in the microproppant slurry in at least a portion of the one or more fractures in the subterranean formation.

20 Claims, 2 Drawing Sheets

(56) References Cited

U.S. PATENT DOCUMENTS

| | | |
|---|---|---|
| 2010/0101795 A1 | 4/2010 | Watson et al. |
| 2014/0060831 A1* | 3/2014 | Miller ............... C09K 8/66 166/280.1 |
| 2015/0075779 A1* | 3/2015 | Walters ............ E21B 49/008 166/250.1 |
| 2016/0076352 A1 | 3/2016 | Nguyen et al. |
| 2016/0108307 A1 | 4/2016 | Nguyen et al. |
| 2017/0066957 A1* | 3/2017 | LaBlanc ............... C09K 8/72 |
| 2017/0152432 A1 | 6/2017 | Vo et al. |
| 2017/0218262 A1 | 8/2017 | Nguyen et al. |
| 2018/0127640 A1 | 5/2018 | Nguyen et al. |
| 2018/0362841 A1 | 12/2018 | Cook |
| 2019/0249065 A1* | 8/2019 | Singh ................ C09K 8/725 |
| 2019/0383126 A1 | 12/2019 | Nguyen et al. |

OTHER PUBLICATIONS

R.D. Barree et al: "The Limits of Fluid Flow in Propped Fractures—the Disparity Between Effective Flowing and Created Fracture Lengths" SPE-194355-MS, Society of Petroleum Engineers, Feb. 2019, 27 pages.

Raterman et al: "Sampling a Stimulated Rock Volume: An Eagle Ford Example" DOI 10.15530/urtec-20172670034, Unconventional Resources Technology Conference, Jul. 2017, 18 pages.

\* cited by examiner

METHODS OF LOW-RATE HYDRAULIC FRACTURING TREATMENTS

BACKGROUND

The present disclosure relates to systems and methods for treating subterranean formations using low injection rates.

In the production of hydrocarbons from a subterranean formation, the subterranean formation should be sufficiently conductive to permit the flow of desirable fluids to a well bore penetrating the formation. One type of treatment used in the art to increase the conductivity of a subterranean formation is hydraulic fracturing. Hydraulic fracturing operations generally involve pumping a treatment fluid (e.g., a fracturing fluid or a "pad fluid") into a well bore that penetrates a subterranean formation at or above a sufficient hydraulic pressure to create or enhance one or more pathways, or "fractures," in the subterranean formation. These fractures generally increase the permeability and/or conductivity of that portion of the formation. The fluid may comprise particulates, often referred to as "proppant particulates," that are deposited in the resultant fractures. The proppant particulates are thought to help prevent the fractures from fully closing upon the release of the hydraulic pressure, forming conductive channels through which fluids may flow to a well bore.

Generally, fracturing treatment in a rock formation can create single fractures which extend from sides of the well bore. However, it may not be feasible to create such fractures in many carboniferous formations, such as shales, clays, and/or coal beds. These carboniferous formations typically have finely laminated structures that are easily broken down into pieces. Therefore, creating an effective fracture network in these formations is not always feasible using conventional fracturing methods.

Further, large volumes of water and high injection rates are being applied in current shale fracturing treatments. In some circumstances, high injection rates with large volumes of water and slurry can result in equipment damage and bears a burden of costs for repair and downtime.

BRIEF DESCRIPTION OF THE DRAWINGS

These drawings illustrate certain aspects of some of the embodiments of the present disclosure and should not be used to limit or define the claims.

Figure 1:
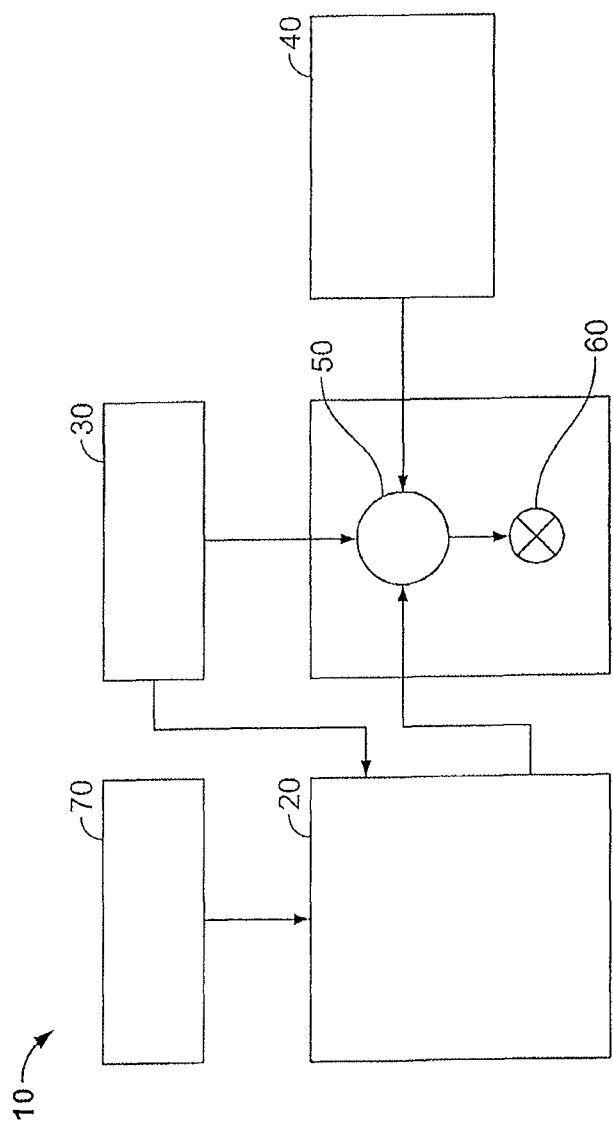
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving well bores may be applicable to horizontal, vertical, deviated, or otherwise nonlinear well bores in any type of subterranean formation. Embodiments may be applicable to injection wells, monitoring wells, and production wells, including hydrocarbon or geothermal wells.

The methods and systems of the present disclosure may, among other things, enable the creation and/or enhancement of one or more conductive channels and/or enhanced fracture geometries about a subterranean formation. More specifically, the present disclosure provides fracturing systems and methods that introduce sequential (e.g., alternating repeating) stages of proppant-carrying treatment fluid into a subterranean formation. In one or more embodiments, the treatment fluid may be interspersed with a reactive agent that reacts slowly with other components. In one or more embodiments, the present disclosure provides fracturing systems and methods that introduce alternating stages of proppant-carrying treatment fluid and "clean" treatment fluid (e.g., spacer fluids) into a subterranean formation interspersed with the reactive agent. As used herein, "clean" treatment fluid refers to a fluid that comprises a lesser concentration of proppant than the proppant-carrying treatment fluid (although a "clean" treatment fluid may still comprise other materials and/or additives such as reactive agents). In certain embodiments, the reactive agent may be introduced while alternating stages of proppant-carrying treatment fluid and "clean" treatment fluid are introduced into the formation. In other embodiments, the reactive agent may be introduced into the treatment fluid and/or the formation in one or more pulses that alternate and/or overlap with the alternating stages of proppant (e.g., proppant-reactive agent-proppant). In still other embodiments, some combination of these patterns may be used. The cycles of alternating stages of proppant-carrying treatment fluid and "clean" treatment fluid may vary in weight and/or density and may induce cycles or other variations of hydrostatic pressure exerted on the formation as the fluids are introduced.

Sequential introduction of the aforementioned fluids may be achieved, in some embodiments, through a fluid pumping strategy such as pump cycling, for any suitable number of injections. The cycling of sequential stages of proppant-carrying treatment may vary in weight and/or density and may induce cycles or other variations of hydrostatic pressure exerted on the formation as the fluids are introduced. Pump cycling may include any suitable means of accomplishing the alternating introduction of the stage fluids. In some embodiments, it may include alternating the fluid fed (e.g., alternating between feeding less-concentrated fluid and proppant-carrying fluid) into a single pump for pumping treatment fluid downhole (e.g., down casing, tubing, and/or a wellbore penetrating a subterranean formation and then out into the subterranean formation). In other embodiments, it may include introducing the treatment fluid comprising a lesser amount of particulates downhole via an annulus defined between the well bore and outer tubing or casing of the well and introducing proppant-carrying fluid down the tubing or casing, or vice-versa, for intermixing downhole. In certain embodiments, pump cycling may include using two or more pumps, each pumping a stage of fluid downhole in alternating succession. For example, where two pumps are used, a first pump fed by a reservoir of less-concentrated fluid may be cycled on, and then cycled off at substantially the same time that a second pump fed by a reservoir of particulate-laden fluid is cycled on. Then, the second pump may be cycled off at substantially the same time that the first pump is cycled back on again, and so on, such that the end result is the introduction of alternating stages of fluids into the subterranean formation. In some embodiments, a clean treatment fluid may be continuously pumped into the subterranean formation for substantially the entire duration of a fracturing treatment, while proppant and/or a proppant-carrying fluid may be intermittently injected into the clean treatment fluid, so as to result in alternating sequences of (i) a clean treatment fluid and (ii) a proppant-carrying treatment fluid being introduced into the wellbore and/or the subterranean formation. That is, proppant may be injected into the fluid by various means, including intermittent injection of dry particulates into the treatment fluid, and/or intermittent injection of a proppant-carrying fluid into the fluid stream. In other embodiments, a continuous stream of proppant-carrying fluid may be pumped into the subterranean formation, with stages of a clean treatment fluid injected into the concentrated fluid stream, achieving a similar effect of alternating sequences of proppant-carrying fluid and clean treatment fluid introduced into the well bore and/or the subterranean formation. Thus, the stages of the treatment fluid comprising a lesser amount of proppant and the proppant-carrying fluid may originate with the fluid reservoir, with the pump, and/or may be created by intermittent injection of particulate into a continuous stream of fluid (e.g., treatment fluid), as hereinabove described.

This may, among other benefits, enable the creation and/or enhancement of more varied fracture geometries and patterns (e.g., secondary/tertiary fractures, branched fractures, dendritic fractures, etc.) in the formation. The sequential injection may be repeated a plurality of times to extend and propagate the fracture depth and complexity and to enhance conductive channels connecting the stimulated formation to the well bore. The injection rate for the treatment fluid may be relatively low when compared to conventional injection rates. For example and without limitation, the low injection rate may be from about 2 barrels-per-minute to about 15 barrels-per-minute. In certain embodiments, the treatment fluids may comprise a microproppant slurry and a reactive agent. In one or more embodiments, the treatment fluids may comprise agents capable of providing other types of reaction (for example, dissolution reactions to improve porosity and enhance permeability, or acid reactions). For example, the reactive agent may have a rate of reaction, or period of reactivity, that is several orders of magnitude lower than hydrochloric acid when the reactive agent contacts carbonate-rich rock. In one or more embodiments, the reactive agent may be an acid itself or a component that releases acid on a delayed basis. In certain embodiments, the reactive agent may remain active for hours, enabling the treatment fluid to be placed deeper into the created fracture system. Without limitations, the reactive agent may remain active for a period of reactivity from about 1 day to about 5 days, from about 5 days to about 2 weeks, from about 2 weeks to about 6 weeks, and combinations thereof. The reactive agent may induce additional leak-off from within a fracture into natural flaws within the rock. By inducing the additional leak-off, a fluid path in which a plurality of microproppants can be placed may be created.

In certain embodiments, hydraulic fracturing treatments may be performed substantially simultaneously (e.g., in parallel) using the same pumping equipment in a plurality of wells at a low injection rate for each well, thereby reducing the necessary total horsepower and minimum pumping rate when compared to a conventional high rate (for example, slickwater fracturing operations). The ability to apply the hydraulic fracturing treatments substantially simultaneously (e.g., using the same pumping equipment) across the plurality of wells may compensate for the increased duration of time spent to inject the treatment fluid on any given well. In using a low injection rate, friction reducers may not be needed within the treatment fluids as microproppants will not settle in water. Where larger proppants are used, the fluid properties may be designed to carry the proppant to the desired point in a given wellbore. When using a horizontal wellbore, particle suspension and carrying properties may be required. In certain embodiments, less volumes of water and/or frac sand may be required, and sensing equipment may be able to survive the low injection rate as opposed to conventional higher rates.

The treatment fluids used in the methods and systems of the present disclosure may comprise any base fluid known in the art, including aqueous fluids, non-aqueous fluids, gases, or any combination thereof. Aqueous fluids that may be suitable for use in the methods and systems of the present disclosure may comprise water from any source, provided that it does not contain compounds that adversely affect other components of the treatment fluid. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of gelling agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like.

The treatment fluids used in the methods and systems of the present disclosure may comprise a plurality of proppants. The proppants used in the methods and systems of the present disclosure may comprise any particulate capable of being deposited in one or more of the fractures in the formation (whether created, enhanced, and/or pre-existing). In embodiments, larger particles may function to divert and smaller particles may stay with the fluid. Further, the proppant particulates may be bi-modal with one of the dominant concentrations being microproppant. Examples of proppant particulates that may be suitable for use include, but are not limited to: bubbles or microspheres, such as made from glass, ceramic, polymer, sand, and/or another material.

Other examples of proppant particulates may include particles of any one or more of: calcium carbonate ($CaCO_3$); barium sulfate ($BaSO_4$); organic polymers; cement; boric oxide; slag; sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and combinations thereof. Suitable composite particulates may comprise a binder and a filler material wherein suitable filler materials may include any one or more of: silica; alumina; fumed carbon; carbon black; graphite; mica; titanium dioxide; meta-silicate; calcium silicate; kaolin; talc; zirconia; boron; fly ash; hollow glass microspheres; solid glass; and combinations thereof. In certain embodiments, the proppant particulates may be at least partially coated with one or more substances such as tackifying agents, silyl-modified polyamide compounds, resins, crosslinkable aqueous polymer compositions, polymerizable organic monomer compositions, consolidating agents, binders, or the like.

The proppant particulates may be of any size and/or shape suitable for the particular application in which they are used. In one or more embodiments, the proppant particulates may have a particle size less than 100 microns. In certain embodiments, the proppant particulates used may have a particle size in the range of from about 2 to about 400 mesh, U.S. Sieve Series. In certain embodiments, the proppant may comprise graded sand having a particle size in the range of from about 10 to about 70 mesh, U.S. Sieve Series. Preferred sand particle size distribution ranges may be one or more of 10-20 mesh, 20-40 mesh, 30-50 mesh, 40-60 mesh or 50-70 mesh, depending on, for example, the fracture geometries of the formation, the location in the formation where the proppant particulates are intended to be placed, and other factors. In certain embodiments, a combination of proppant particulates having different particle sizes, particle size distributions, and/or average particle sizes may be used. In certain embodiments, proppant particulates of different particle sizes, particle size distributions, and/or average particle sizes may be used in different stages of proppant-carrying fluid in a single fracturing operation. For example, earlier stages of proppant-carrying fluid may include smaller proppant particulates that can enter the narrower tip regions of fractures in the formation, while larger proppant particulates may be used in subsequent stages that may be deposited in the fracture without approaching the tip regions.

Proppants may be included in the proppant-carrying treatment fluid in any suitable concentration. In certain embodiments, the concentration of particulates in the proppant-carrying treatment fluid may range from about 0.1 to about 8 lb/gal. In other embodiments, it may range from about 0.5 to about 5.0 lb/gal, and in some embodiments, from about 1.5 to about 2.5 lb/gal. In some embodiments, the concentration of particulates in the proppant-carrying fluid may have an approximate lower range of any one of: 0.5, 0.6, 0.7, 0.8, 0.9, 1.0, 1.1, 1.2, 1.3, 1.4, 1.5, 1.6, 1.7, 1.8, 1.9, and 2.0 lb/gal; and an upper range of approximately any one of: 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6. 3.7, 3.8, 3.9, 4.0, 4.1, 4.2, 4.3, 4.4, 4.5 lb/gal, and so on up to 8.0 lb/gal in increments of 0.1 lb/gal. Thus, the concentration range of particulates of some example embodiments may be from about 0.5 lb/gal to about 1.0 lb/gal, or from about 1.0 lb/gal to about 4.4 lb/gal, or from about 2.0 lb/gal to about 2.5 lb/gal, and so on, in any combination of any one of the upper and any one of the lower ranges recited above (including any 0.1 lb/gal increment between 4.5 and 8.0 lb/gal). A person of skill in the art with the benefit of this disclosure will recognize the appropriate amount of proppants to use in an application of the present disclosure based on, among other things, the type of formation, the particle size of the proppant, the parameters of the fracturing operation, fracture geometries, and the like. In certain embodiments, the proppants may be categorized as microproppants or may generally be inclusive of microproppants.

In certain embodiments, the treatment fluids used in the methods of the present disclosure may include a plurality of microproppant particles, for example, to be placed in microfractures within the subterranean formation. As used herein, the term "plurality" refers in a non-limiting manner to any integer equal or greater than 1. The use of the phrase "plurality of microproppant particles" is not intended to limit the composition of the plurality of microproppant particles or the type, shape, or size, etc. of the microproppant particles within the plurality. For instance, in certain embodiments, the composition of the plurality of microproppant particles may be substantially uniform such that each microproppant particle within the plurality is of substantially similar type, shape, and/or size, etc. In other embodiments, the composition of the plurality of microproppant particles may be varied such that the plurality includes at least one microproppant particle of a particular type, shape, and/or size, etc. and at least one other microproppant particle of a different type, shape, and/or size, etc.

Examples of materials that may be suitable for use as microproppant particles in certain embodiments of the present disclosure include, but are not limited to, fly ash, silica, alumina, fumed carbon (e.g., pyrogenic carbon), carbon black, graphite, mica, titanium dioxide, metal-silicate, silicate, kaolin, talc, zirconia, boron, hollow microspheres (e.g., spherical shell-type materials having an interior cavity), glass, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. In certain embodiments, microproppant particles may become anchored and/or adhered to fracture faces within the microfracture, which may produce solid masses in the forms of high strength ridges, bumps, patches, or an uneven film on the fracture face. This may, among other benefits, further assist in maintaining the conductivity of the microfractures.

The microproppant particles may be of any shape (regular or irregular) suitable or desired for a particular application. In some embodiments, the microproppant particles may be round or spherical in shape, although they may also take on other shapes such as ovals, capsules, rods, toroids, cylinders, cubes, or variations thereof. In certain embodiments, the microproppant particles of the present disclosure may be relatively flexible or deformable, which may allow them to enter certain perforations, microfractures, or other spaces within a subterranean formation whereas solid particulates of a similar diameter or size may be unable to do so.

In certain embodiments, the plurality of microproppant particles may have a mean particle diameter of about 100 microns or less. In certain embodiments, the plurality of microproppant particles may have a mean particle diameter in a range of from about 0.1 microns to about 100 microns. In one or more embodiments, the plurality of microproppant particles may have a mean particle diameter in a range of from about 0.1 microns to about 50 microns. In one or more embodiments, the plurality of microproppant particles may have a mean particle diameter of about 25 microns or less, in other embodiments, a mean particle diameter of about 10 microns or less, and in other embodiments, a mean particle diameter of about 5 microns or less.

As used herein, the term "diameter" refers to a straight-line segment joining two points on the outer surface of the microproppant particle and passing through the central region of the microproppant particle, but does not imply or require that the microproppant particle is spherical in shape or that it have only one diameter. As used herein, the term "mean particle diameter" refers to the sum of the diameter of each microproppant particle in the plurality of microproppant particles divided by the total number of the microproppant particles in the plurality of microproppant particles. The mean particle diameter of the plurality of microproppant particles may be determined using any particle size analyzer known in the art. In certain embodiments, the mean particle diameter of the plurality of microproppant particles may be determined using a representative subset or sample of microproppant particles from the plurality of microproppant particles. A person of skill in the art with the benefit of the present disclosure will understand how to select such a representative subset or sample of microproppant particles from the plurality of microproppant particles.

In certain embodiments, each of the microproppant particles may have particle sizes smaller than 100 mesh (149 microns), and in certain embodiments may have particle sizes equal to or smaller than 200 mesh (74 microns), 230 mesh (63 microns) or even 325 mesh (44 microns). The size and/or diameter of the microproppant particles may be tailored for a particular application based on, for example, the estimated width of one or more microfractures within a subterranean formation in which the microproppant particles are to be used, as well as other factors. In certain embodiments, the microproppant particles may have a mean particle size distribution less than 100 microns.

In certain embodiments, the microproppant particles may be present in the treatment fluids of the present disclosure in an amount up to about 10 pounds of microproppant particles per gallon of treatment fluid ("ppg"). In certain embodiments, the microproppant particles may be present in the treatment fluids of the present disclosure in an amount within a range of from about 0.01 ppg to about 10 ppg. In one or more embodiments, the microproppant particles may be present in the treatment fluids of the present disclosure in an amount within a range of from about 0.01 ppg to about 0.1 ppg, in other embodiments, from about 0.1 ppg to about 1 ppg, in other embodiments, from about 1 ppg to about 2 ppg, in other embodiments, from about 2 ppg to about 3 ppg, in other embodiments, from about 3 ppg to about 4 ppg, in other embodiments, from about 4 ppg to about 5 ppg, in other embodiments, from about 5 ppg to about 6 ppg, in other embodiments, from about 6 ppg to about 7 ppg, in other embodiments, from about 7 ppg to about 8 ppg, in other embodiments, from about 8 ppg to about 9 ppg, and in other embodiments, from about 9 ppg to about 10 ppg. In certain embodiments, the microproppant particles may be present in the treatment fluids of the present disclosure in an amount within a range of from about 0.01 ppg to about 0.5 ppg. In one or more embodiments, the microproppant particles may be present in the treatment fluids of the present disclosure in an amount within a range of from about 0.01 ppg to about 0.05 ppg, in other embodiments, from about 0.05 ppg to about 0.1 ppg, in other embodiments, from about 0.1 ppg to about 0.2 ppg, in other embodiments, from about 0.2 ppg to about 0.3 ppg, in other embodiments, from about 0.3 ppg to about 0.4 ppg, and in other embodiments, from about 0.4 ppg to about 0.5 ppg. The concentration of the microproppant particles in the treatment fluid may vary depending on the particular application of the treatment fluid (for example, pre-pad fluid, pad fluid, or spacer fluid). In some embodiments, the treatment fluid (e.g., pre-pad fluid) may not contain any microproppant particles.

In the methods and compositions of the present disclosure, the treatment fluid may comprise a reactive agent comprising at least one compound that includes at least one aminopolycarboxylic acid functional group and at least one phosphonic acid functional group. In certain embodiments, the treatment fluid may comprise any combination of one or more compounds that include at least one aminopolycarboxylic acid functional group and at least one phosphonic acid functional group. In certain embodiments, the treatment fluid consists of one or more phosphorylated aminocarboxylic acids. According to certain embodiments, the treatment fluid may comprise N-phosphonomethyl iminodiacetic acid (PMIDA), which has such structure as Formula I below.

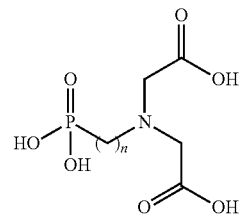

Formula I

In some embodiments, the treatment fluid may comprise phosphono(amino-carboxylic) acids such as N,N-bis(phosphonomethyl)glycine. In certain embodiments, the treatment fluid may comprise one or more diphosphonic and aminophosphonic acids that remain substantially undissolved in the fluids of the present disclosure. Representative examples of such compounds that may be used include, but are not limited to, phosphonobutane-1,2,4-tricarboxylic acid, iminobis(methylenephosphonic acid), and nitrilotris(methylene phosphonic acid). In certain embodiments, PMIDA may be the reactive agent present in the treatment fluid. Once injected, the PMIDA may react with the shale and/or calcite-laden formation to etch and/or widen the channels extended from the natural and induced fractures. In one or more embodiments, the PMIDA acting as the reactive agent may be utilized at a near neutral pH. In embodiments, there may be a surface chemical exchange process where a portion of $CaCO_3$ is removed from and phosphonate material is deposited onto the surface encountering the PMIDA. This may increase the permeability of the surface and alter the shape of the pore throat. Without limitations, PMIDA may be active for a period of reactivity that is slower than conventional acids, such as hydrochloric acid, by a factor of $10^{20}$.

In certain embodiments, the systems and methods of the present disclosure may utilize an organic or mineral acid. Examples of organic and mineral acids that may be used according to certain embodiments of the present disclosure include, for example, hydrochloric acid, hydrobromic acid, formic acid, acetic acid, chloroacetic acid, dichloroacetic acid, trichloroacetic acid, methanesulfonic acid, citric acid, maleic acid, glycolic acid, lactic acid, malic acid, oxalic acid, sulfamic acid, succinic acid, urea-stabilized or alkylurea derivatives of the halide acids or of oxyanion acids where the anion is one of C, N, P, S, Se, Si, or similar anions, and any combination thereof. In some embodiments, the acid may be generated from an acid-generating compound. Examples of suitable acid-generating compounds may include, but are not limited to, esters, aliphatic polyesters, orthoesters, poly(orthoesters), poly(lactides), poly(glycolides), poly(ε-caprolactones), poly(hydroxybutyrates), poly(anhydrides), phthalates, terephthalates, ethylene glycol monoformate, ethylene glycol diformate, diethylene glycol diformate, glyceryl monoformate, glyceryl diformate, glyceryl triformate, triethylene glycol diformate, formate esters of pentaerythritol, polyuria or urea polymers, the like, any derivative thereof, and any combination thereof.

In some embodiments, a treatment fluid may comprise a hydrolysable in-situ acid generator, a hydrolysable in-situ chelating agent generator, and mixtures thereof; wherein the hydrolysable in-situ acid generator comprises at least one hydrolysable acid ester; wherein the hydrolysable acid ester comprises at least one member selected from the group consisting of homo- and copolymers of lactic and glycolic acid, homo- and copolymers of vinyl methylsulphonate and vinyl methylphosphonate and dimethylphosphonate; and any combination thereof, wherein the hydrolysable in-situ chelating agent generator comprises at least one polymer capable of hydrolyzing to an acid and a chelating agent; wherein the polymer comprises at least one of the following monomers: phosphonate monomers, sulfonate monomers, and combinations thereof, wherein the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl) iminodiacetic acid, 2-Carboxyethyl phosphonic acid, 2-Hydroxyphosphonocarboxylic acid, Amino-tris-(methylene-phosphonic acid), and combinations thereof.

In some embodiments, a treatment fluid may be a synthetic acid composition comprising urea and hydrogen chloride in a molar ratio of not less than 0.1:1; and a metal iodide or iodate. This synthetic acid composition may further include aminoalkylphosphonic salt and/or a phosphonic acid derivative.

In some embodiments, a treatment fluid may be a synthetic acid composition comprising an aqueous solution of glycine and hydrogen chloride.

In some embodiments, a method of generating hydrofluoric acid in-situ (i.e., in the formation) comprises having a treatment fluid comprising a base fluid, an acid, and a fluoride releasing agent selected from the group consisting of an amine monofluorophosphate; a bisamine monofluorophosphate; any derivative thereof; and any combination thereof, wherein the acid and the fluoride releasing agent react to generate hydrofluoric acid over time in the subterranean formation so as to create or enhance at least one microfracture therein.

The diverting agents used in the methods and systems of the present disclosure may comprise any particulate material capable of altering some or all of the flow of a substance away from a particular portion of a subterranean formation to another portion of the subterranean formation or, at least in part, ensure substantially uniform injection of a treatment fluid (e.g., a treatment fluid) over the region of the subterranean formation to be treated. Diverting agents may, for example, selectively enter more permeable zones of a subterranean formation, where they may create a relatively impermeable barrier across the more permeable zones of the formation (including by bridging one or more fractures), thus serving to divert a subsequently introduced treatment fluid into the less permeable portions of the formation. In certain embodiments, the proppants and/or microproppants used in the methods and systems of the present disclosure may serve a dual purpose as both to prevent fractures from fully closing upon the release of the hydraulic pressure thereby forming conductive channels through which fluids may flow to a well bore and as a diverting agent. Such dual-purpose particulates may be referred to herein as "self-diverting" proppants and/or microproppants (while the proppants and/or microproppants may be self-diverting, the term "self-diverting proppants" will be used hereafter to be inclusive of both proppants and microproppants).

In certain embodiments, diverting effects of the self-diverting proppants may be temporary. For example, a degradable and/or soluble self-diverting proppant may be used such that it degrades or dissolves, for example, after a period of time in the subterranean formation or when contacted by a particular fluid or fluids. Examples of degradable self-diverting proppants that may be suitable for use in certain embodiments of the present disclosure include, but are not limited to, fatty alcohols, fatty acid salts, fatty esters, proteinous materials, degradable polymers, and the like. Suitable examples of degradable polymers that may be used in accordance with the present disclosure include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly (lactide); poly(glycolide); poly(ε-caprolactone); poly(hydroxybutyrate); poly(anhydrides); aliphatic polycarbonates; poly(acrylamide); poly(ortho esters); poly(amino acids); poly(ethylene oxide); and polyphosphazenes. Polyanhydrides are another type of degradable polymers that may be suitable for use as degradable diverting agents in the present disclosure. Examples of polyanhydrides that may be suitable include poly(adipic anhydride), poly(suberic anhydride), poly(sebacic anhydride), and poly(dodecanedioic anhydride). Other suitable examples include but are not limited to poly(maleic anhydride) and poly(benzoic anhydride).

Self-diverting proppants may be introduced into the subterranean formation in a treatment fluid and may be included in treatment fluids in any suitable concentration. In certain embodiments, the self-diverting proppants may be provided at the well site in a slurry that is mixed into the base fluid of the treatment fluid as the fluid is pumped into a well bore. In certain embodiments, the concentration of the self-diverting proppants in the treatment fluid may range from about 0.01 lbs per gallon to about 1 lbs per gallon. In certain embodiments, the concentration of the self-diverting proppants in the treatment fluid may range from about 0.1 lbs per gallon to about 0.3 lbs per gallon. In certain embodiments, the total amount of the self-diverting proppants used for a particular stage of a fracturing operation may range from about 1000 lbs to about 5000 lbs. A person of skill in the art with the benefit of this disclosure will recognize the appropriate amount of the self-diverting proppants to use in an application of the present disclosure based on, among other things, the type of formation, the particle size of the diverting agent, the parameters of the fracturing operation, the desired fracture geometries, and the like.

In certain embodiments, the treatment fluids used in the methods and systems of the present disclosure optionally may comprise any number of additional additives, among other reasons, to enhance and/or impart additional properties of the composition. For example, the compositions of the present disclosure optionally may comprise one or more salts, among other reasons, to act as a clay stabilizer and/or enhance the density of the composition, which may facilitate its incorporation into a treatment fluid. In certain embodiments, the compositions of the present disclosure optionally may comprise one or more dispersants, among other reasons, to prevent flocculation and/or agglomeration of the solids while suspended in a slurry. Other examples of such additional additives include, but are not limited to, salts, surfactants, acids, acid precursors, chelating agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The methods and systems of the present disclosure may be used during or in conjunction with any subterranean fracturing operation. For example, a treatment fluid may be introduced into the formation at or above a pressure sufficient to create or enhance one or more fractures in at least a portion of the subterranean formation. Such fractures may be "enhanced" where a pre-existing fracture (e.g., naturally occurring or otherwise previously formed) is enlarged or lengthened by the fracturing treatment. Other suitable subterranean operations in which the methods and/or compositions of the present disclosure may be used include, but are not limited to, fracture acidizing, "frac-pack" treatments, and the like.

The treatment fluids used in the methods and systems of the present disclosure may be prepared using any suitable method and/or equipment (e.g., blenders, stirrers, etc.) known in the art at any time prior to their use. In some embodiments, the treatment fluids may be prepared at a well site or at an offsite location. In certain embodiments, an aqueous fluid may be mixed the gelling agent first, among other reasons, in order to allow the gelling agent to hydrate and form a gel. Once the gel is formed, proppants and/or diverting agents may be mixed into the gelled fluid. Once prepared, a treatment fluid of the present disclosure may be placed in a tank, bin, or other container for storage and/or transport to the site where it is to be used. In other embodiments, a treatment fluid of the present disclosure may be prepared on-site, for example, using continuous mixing or "on-the-fly" methods, as described below.

In certain embodiments, the treatment fluid comprising a reactive agent and a microproppant slurry may be pumped into the formation at a low injection rate in sequential stages. In certain embodiments, a delayed binding agent may be included in the treatment fluid to enhance stabilization of formed microproppant pillars, nodes, aggregates, and combinations thereof, thereby allowing them to maintain their structure during well production. During operations, the sequential injection may promote the formed microproppant masses to be dissected into a plurality of fragments by creating channels through said masses.

In certain embodiments of the methods and systems of the present disclosure, one or more additional fluids may be introduced into the well bore before, after, and/or concurrently with the treatment fluid, for any number of purposes or treatments in the course of a fracturing operation. Examples of such fluids include, but are not limited to, preflush fluids, pad fluids, pre-pad fluids, acids, afterflush fluids, cleaning fluids, and the like. For example, a pad fluid may be pumped into the well bore prior to the sequential stages of proppant-carrying treatment fluid and clean treatment fluid. In certain embodiments, another volume of pad fluid may be pumped into the well bore between each one of the sequential stages. The "clean" treatment fluid generally comprises a lesser concentration of proppant than the proppant-carrying treatment fluid. In certain embodiments, a "clean" treatment fluid may be a fluid that is substantially free of proppant and/or does not comprise a significant concentration of proppant, although in other embodiments a "clean" treatment fluid may comprise some significant concentration of proppant. A person of skill in the art with the benefit of this disclosure will recognize the appropriate types of additional fluids to use, and when they may be used, in the methods and systems of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation m which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time and may facilitate the preparation of fracturing fluids in accordance with the present disclosure using continuous mixing or "on-the-fly" methods. Thus, for example, the pumping and blender system 50 can provide just fracturing fluid into the well at sometimes, just proppants at other times, and combinations of those components at yet other times.

Figure 2:
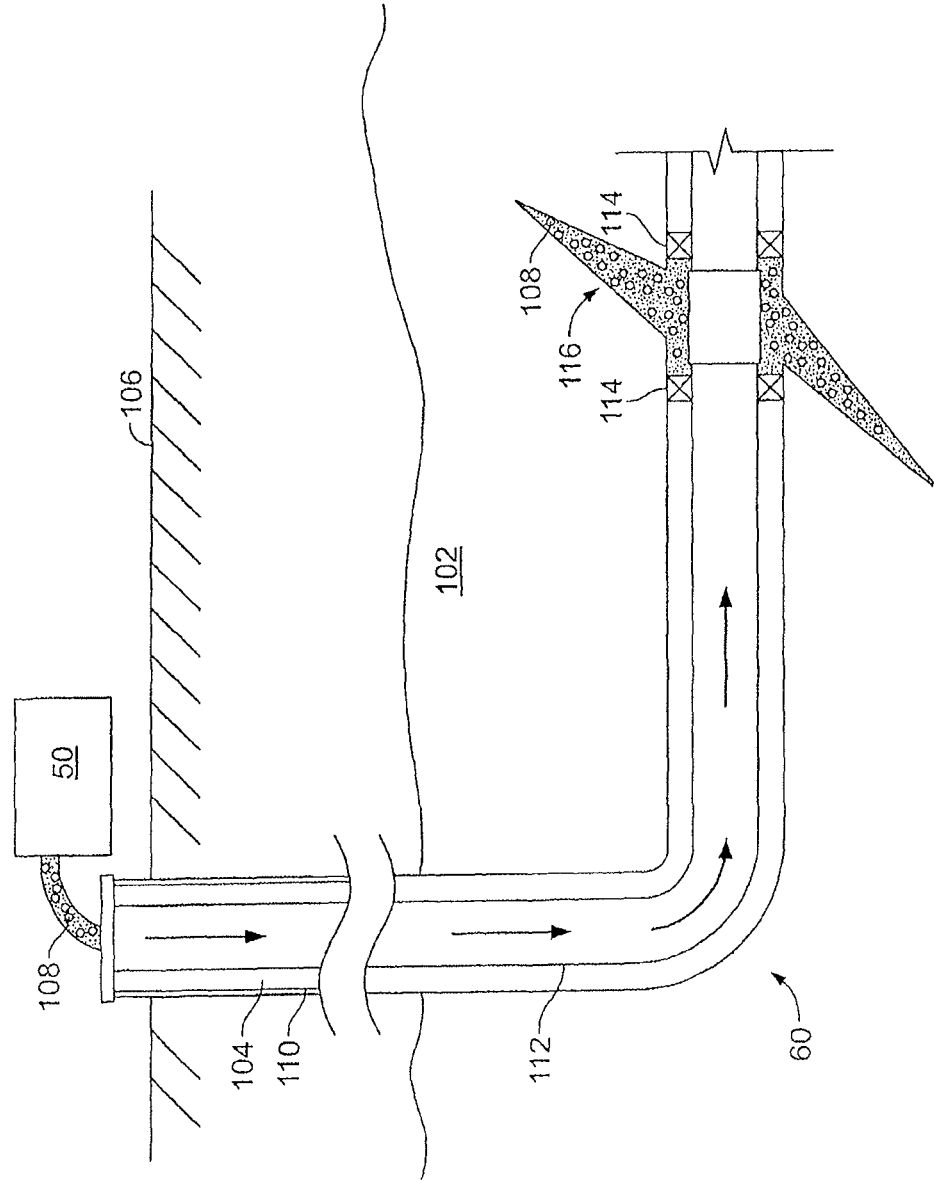
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

A person skilled in the art, with the benefit of this disclosure, will recognize that while FIG. 2 depicts a singular well 60, there may be a plurality of wells 60 undergoing a treatment. In certain embodiments, the injection flow rate for a singular well 60 containing several intervals of interest may be determined by the injection rate per perforation and the number of perforations per cluster for each interval of interest. In embodiments, each interval of interest may comprise one or more clusters which may comprise one or more perforations. The injection flow rate for a given cluster may be determined by dividing the flow rate by the number of perforations. In these embodiments, both the minimum and maximum flow rates may be determined by analyzing the minimum and maximum number of perforations per cluster. In one or more embodiments where there is a plurality of wells 60, the total injection rate may be apportioned among the plurality of wells 60 involved in simultaneous fracturing treatments. In embodiments, the treatment fluid may be injected into each of the plurality of wells 60 simultaneously. In one or more embodiments, the injection flow rate may vary between each one of the plurality of wells 60 depending on the number of perforations within each well 60.

While not specifically illustrated herein, the disclosed methods and compositions may also directly or indirectly affect the various downhole equipment and tools that may come into contact with the treatment fluids during operation. Such equipment and tools may include, but are not limited to, well bore casing, well bore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other well bore isolation devices, or components, and the like. Any of these components may be included in the systems generally described above and depicted in FIGS. 1 and 2.

An embodiment of the present disclosure is a method comprising: determining an injection flow rate for each one of the plurality of wells; determining a total injection flow rate for a plurality of wells; introducing sequentially a series of treatment fluids into a well bore of each one of the plurality of wells, wherein the well bore penetrates at least a portion of a subterranean formation, the series of treatment fluids comprising: a first treatment fluid that comprises a base fluid and a reactive agent; and a second treatment fluid that comprises a microproppant slurry; allowing the first treatment fluid to form one or more fractures in the subterranean formation, wherein the first treatment fluid is introduced into at least one of the well bores at or above a pressure sufficient to create or enhance the one or more fractures in the subterranean formation; and depositing at least a portion of a microproppant in the microproppant slurry in at least a portion of the one or more fractures in the subterranean formation.

In one or more embodiments described in the preceding paragraph, wherein the series of treatment fluids react with the formation to etch or widen channels extending from the one or more fractures. In one or more embodiments described above, wherein the at least one fracture comprises one or more microfractures. In one or more embodiments described above, further comprising introducing a pad fluid into the well bore prior to introducing the treatment fluid at or above a pressure sufficient to create or enhance at least one fracture in the subterranean formation. In one or more embodiments described above, wherein the series of treatment fluids comprise a hydrolysable in-situ acid generator, a hydrolysable in-situ chelating agent generator, and mixtures thereof. In one or more embodiments described above, wherein the series of treatment fluids is introduced at an injection flow rate for each one of the plurality of wells in a range of about 2 barrels-per-minute to about 15 barrels-per-minute. In one or more embodiments described above, wherein the microproppant slurry further comprises a delayed binding agent. In one or more embodiments described above, wherein the microproppant slurry comprises a plurality of microproppants with a mean particle size distribution less than 100 microns, wherein the plurality of microproppants are self-diverting. In one or more embodiments described above, wherein the plurality of microproppants consists of fly ash or fine silica particles. In one or more embodiments described above, wherein determining the injection flow rate for each one of the plurality of wells is based on the injection flow rate by the number of perforations in a cluster. In one or more embodiments described above, further comprising of determining a minimum and a maximum number of perforations in the cluster.

Another embodiment of the present disclosure is a method comprising: providing a series of fracturing fluids, wherein each one of the series of fracturing fluids comprises a base fluid, a reactive agent, and a microproppant slurry; and introducing sequentially the series of fracturing fluids into a well bore of each one of a plurality of wells penetrating at least a portion of a subterranean formation at or above a pressure sufficient to create or enhance one or more fractures in the portion of the subterranean formation a plurality of times sequentially, wherein each one of the series of fracturing fluids is introduced at an injection flow rate of about 2 barrels-per-minute to about 15 barrels-per-minute.

In one or more embodiments described in the preceding paragraph, wherein the one or more fractures comprise one or more microfractures. In one or more embodiments described above, wherein the series of fracturing fluids react with the formation to etch or widen channels extending from the one or more fractures. In one or more embodiments described above, wherein the series of treatment fluids comprise a hydrolysable in-situ acid generator, a hydrolysable in-situ chelating agent generator, and mixtures thereof. In one or more embodiments described above, wherein the microproppant slurry further comprises a delayed binding agent. In one or more embodiments described above, wherein the microproppant slurry comprises a plurality of microproppants with a mean particle size distribution less than 100 microns, wherein the plurality of microproppants are self-diverting. In one or more embodiments described above, wherein the plurality of microproppants consists of fly ash or fine silica particles. In one or more embodiments described above, wherein the injection flow rate for each one of the plurality of wells is determined based on the injection flow rate per perforation and the number of perforations in an interval, and further comprising determining a minimum and a maximum injection rate for each one of the plurality of wells based on a minimum and a maximum number of perforations in the interval. In one or more embodiments described above, further comprising mixing the series of fracturing fluids using mixing equipment, and wherein the series of fracturing fluids is introduced into the subterranean formation using one or more pumps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

What is claimed is:
1. A method comprising:
  determining an injection flow rate for each one of a plurality of wells;
  determining a total injection flow rate for the plurality of wells;
  introducing sequentially a series of treatment fluids into a well bore of each one of the plurality of wells, wherein each of the well bores penetrates at least a portion of a subterranean formation, the series of treatment fluids comprising:
    a first treatment fluid that comprises a base fluid and a reactive agent, wherein the reactive agent comprises at least one compound that includes at least one aminopolycarboxylic acid functional group and at least one phosphonic acid functional group, wherein the reactive agent is at an approximately neutral pH, wherein the reactive agent remains active for a period of reactivity of at least 1 day, based, at least in part, on the pH of the reactive agent; and a second treatment fluid that comprises a microproppant slurry;

allowing the first treatment fluid to form one or more fractures in the subterranean formation, wherein the first treatment fluid is introduced into at least one of the well bores at or above a pressure sufficient to create or enhance the one or more fractures in the subterranean formation; and depositing at least a portion of a microproppant in the microproppant slurry in at least a portion of the one or more fractures in the subterranean formation.

2. The method of claim 1, wherein at least one of the first and second treatment fluids react with the formation to etch or widen channels extending from the one or more fractures.

3. The method of claim 1, wherein the at least one fracture comprises one or more microfractures.

4. The method of claim 1, further comprising introducing a pad fluid into at least one of the well bores at or above a pressure sufficient to create or enhance at least one fracture in the subterranean formation prior to introducing the treatment fluid.

5. The method of claim 1, wherein at least one of the first and second treatment fluids comprises at least one additive selected from the group consisting of: a hydrolysable in-situ acid generator, a hydrolysable in-situ chelating agent generator, and any mixture thereof.

6. The method of claim 1, wherein the series of treatment fluids is introduced at an injection flow rate for each one of the plurality of wells in a range of about 2 barrels-per-minute (bpm) to about 15 bpm.

7. The method of claim 1, wherein the microproppant slurry comprises a plurality of microproppants with a mean particle size distribution less than 100 microns, and wherein the plurality of microproppants are self-diverting.

8. The method of claim 7, wherein the plurality of microproppants comprises fly ash, fine silica particles, or any combination thereof.

9. The method of claim 1, wherein the reactive agent is N-phosphonomethyl iminodiacetic acid.

10. The method of claim 1, wherein the injection flow rate for each one of the plurality of wells is determined based on the injection flow rate per perforation and the number of perforations in an interval.

11. The method of claim 10, further comprising determining a minimum and a maximum injection rate for each one of the plurality of wells based on a minimum and a maximum number of perforations in the interval.

12. The method of claim 1, wherein the first treatment fluid is a synthetic acid composition further comprising urea and hydrogen chloride in a molar ratio of at least 0.1:1.

13. The method of claim 12, wherein the first treatment fluid further comprises a metal iodide or iodate, an aminoalkylphosphonic salt, a phosphonic acid derivative, and any combination thereof.

14. The method of claim 1, wherein the first treatment fluid is a synthetic acid composition further comprising an aqueous solution of glycine and hydrogen chloride.

15. A method comprising:
providing a series of fracturing fluids, wherein each one of the series of fracturing fluids comprises a base fluid, a reactive agent, and a microproppant slurry, wherein the reactive agent comprises at least one compound that includes at least one aminopolycarboxylic acid functional group and at least one phosphonic acid functional group, wherein the reactive agent is at an approximately neutral pH, wherein the reactive agent remains active for a period of reactivity of at least 1 day, based, at least in part, on the pH of the reactive agent; and introducing sequentially the series of fracturing fluids into a well bore of each one of a plurality of wells penetrating at least a portion of a subterranean formation at or above a pressure sufficient to create or enhance one or more fractures in the portion of the subterranean formation a plurality of times sequentially, wherein each one of the series of fracturing fluids is introduced at an injection flow rate of about 2 bpm to about 15 bpm.

16. The method of claim 15, wherein at least one of the fracturing fluids comprises at least one additive selected from the group consisting of: a hydrolysable in-situ acid generator, a hydrolysable in-situ chelating agent generator, and any mixture thereof.

17. The method of claim 15, wherein the microproppant slurry comprises a plurality of microproppants with a mean particle size distribution less than 100 microns, and wherein the plurality of microproppants are self-diverting.

18. The method of claim 17, wherein the plurality of microproppants comprises fly ash, fine silica particles, or any combination thereof.

19. The method of claim 15, wherein the injection flow rate for each one of the plurality of wells is determined based on the injection flow rate per perforation and the number of perforations in an interval, and further comprising determining a minimum and a maximum injection rate for each one of the plurality of wells based on a minimum and a maximum number of perforations in the interval.

20. The method of claim 15, further comprising mixing the series of fracturing fluids using mixing equipment, and wherein the series of fracturing fluids is introduced into the subterranean formation using one or more pumps.

* * * * *